…

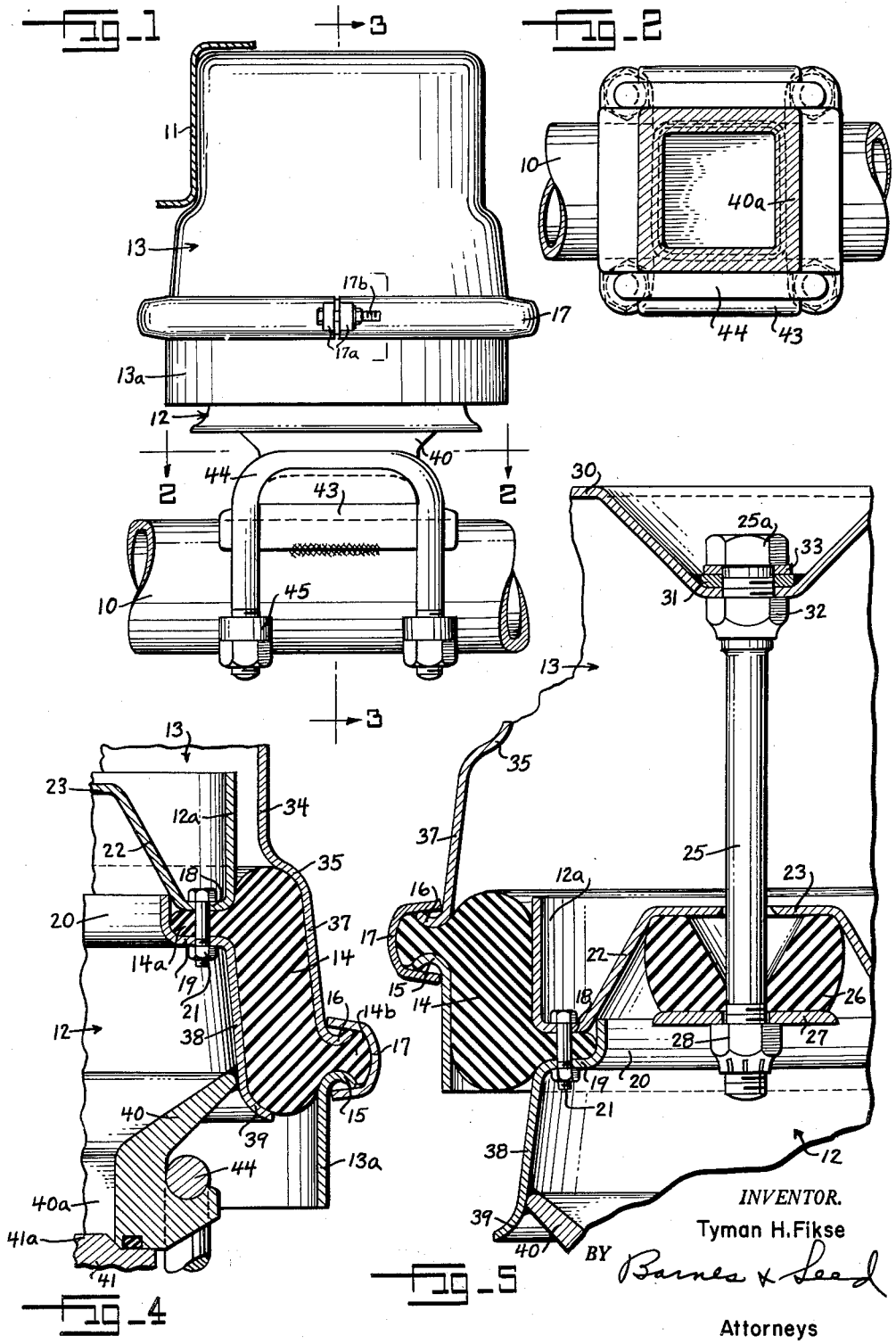

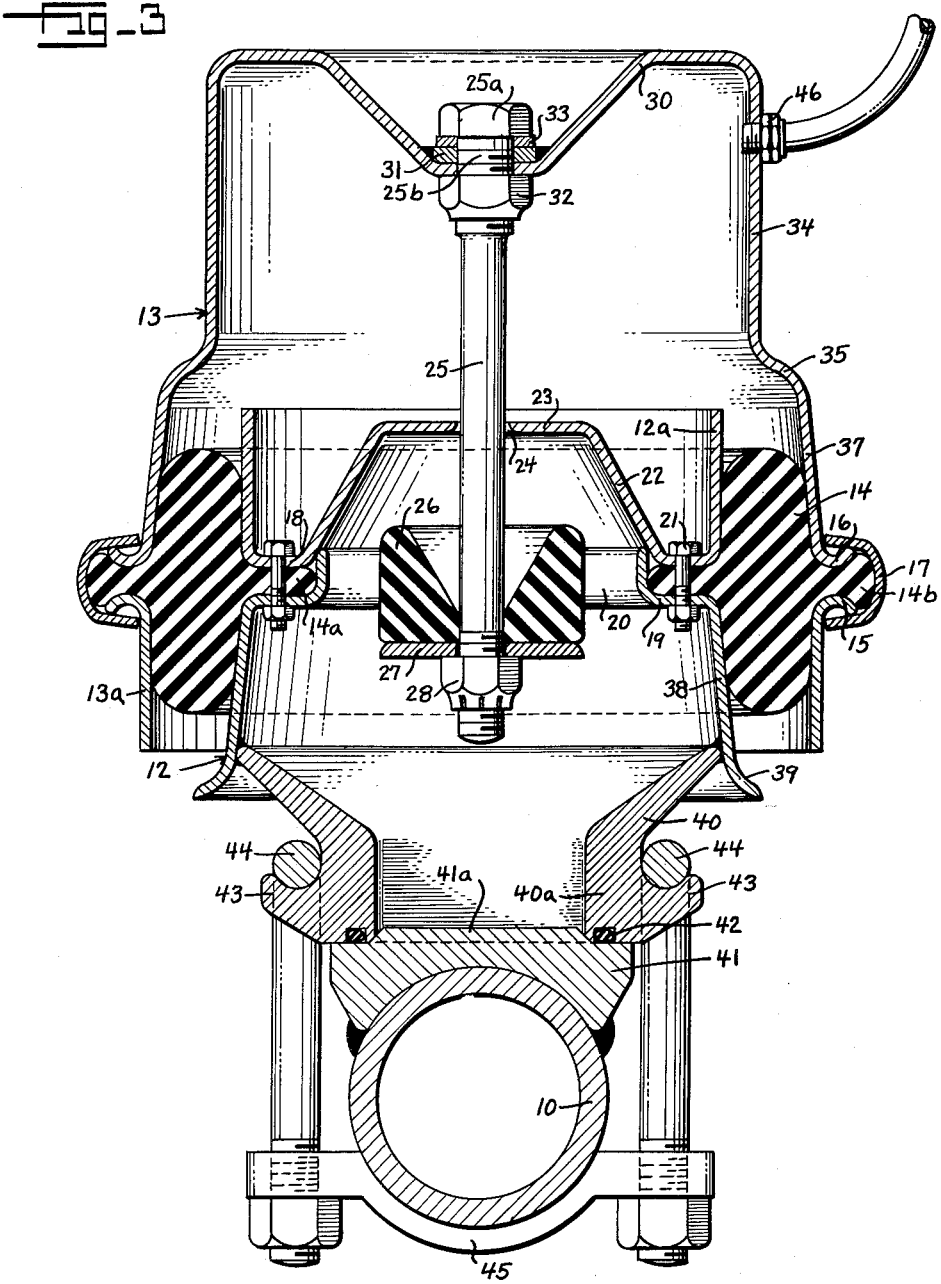

United States Patent Office 2,973,953
Patented Mar. 7, 1961

2,973,953

AIR SPRING ASSEMBLY

Tyman H. Fikse, 4727 38th SW., Seattle, Wash.

Filed Jan. 2, 1957, Ser. No. 632,206

7 Claims. (Cl. 267—63)

The present invention relates to an improved air spring of the general type disclosed in my copending application, Ser. No. 507,109, filed May 9, 1955, now Patent Number 2,905,459, and namely, a spring having inner and outer telescoping units with an elastic ring compressed therebetween which together with the units defines a chamber to which compressed air or some other pressurized fluid is supplied for yieldingly urging the units apart.

The invention aims to provide a superior air spring of simple and economical construction which makes provision for both rebounding and jouncing actions and which can function satisfactorily as a spring should the supply of pressurized fluid thereto be cut off.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is an elevational view of my spring in operative position.

Fig. 2 is a horizontal sectional view taken along the line 2—2 of Fig. 1.

Fig. 3 is a vertical sectional view to an enlarged scale taken along the line 3—3 of Fig. 1.

Figs. 4 and 5 are fragmentary vertical sectional views taken similarly to Fig. 3 and illustrating the inner and outer can units in jouncing and rebounding positions, respectively.

For purposes of example, in the drawings I have illustrated one of my spring assemblies supporting an end of an axle 10 beneath a vehicle frame having a longitudinal frame rail 11 along the corresponding side. The spring has an inner can unit 12 clamped onto the axle and telescopically associated with an outer can unit 13 rigidly suspended as from the frame rail 11. These can units 12, 13 are spaced apart radially speaking and compressed between their telescoping portions is an elastic ring 14. When this ring is relaxed it has a generally round major part cross-sectionally speaking from which extend inner and outer annular fins or ribs 14a, b. It will be noted that the inner rib has flat sides whereas the outer rib is swelled at its outer end. These ribs 14a, b are clamped by the can units 12, 13 and for this purpose the latter have respective inner and outer removable rim sections 12a, 13a. The outer rim section and the outer can unit proper have outturned downwardly and upwardly arched clamping lips 15, 16 for gripping the neck of the swelled outer rib 14b. These lips are urged together by a split clamping ring 17 having a U-section and locked in position by a bolt 17b passing through a pair of ears 17a located at the ends of the ring. For gripping the inner rib 14a of the elastic ring the inner rim section 12a and the inner can proper present flat annular clamping flanges 18, 19, the latter terminating by an upturned lip 20. These two clamping flanges are urged together by bolts 21 passing through the inner rib 14a. Dished upwardly from the clamping flange 18 is a frustro-conical hub section 22 which terminates at a central rebound wall 23. This wall has a center opening 24 for receiving a rod 25 which carries an elastic rebound bumper 26 at its lower end. A washer 27 serves as a seat for the bumper and is held in position by a self-locking nut 28 threaded on the lower end of the rod 25. At its upper end the outer can unit 13 has a closure wall 30 which is downwardly dished at the center to house the head 25a of the rod. Beneath its head the rod has a threaded section 25b of enlarged diameter extending through a bore in the apex of wall 30, a reinforcing washer 31 being provided for the latter. A self-locking nut 32 is threaded into rod section 25b and bears against the underside of wall 30 to anchor the rod. It will be noted that a sealing washer 33 as of copper is compressed between the head 25a of the washer 31 to seal the passage of the rod 25 through the wall 30. From the latter the outer can unit 13 depends cylindrically by a section 34 and then arches outwardly at a shoulder or stop 35. Between this shoulder 35 and the clamping lip 16 the outer can unit has a frustro-conical outer working section 37 which opposes the inner rim 12a.

Paralleling outer can section 37 is an inner working section 38 of frustro-conical shape which depends from the outer edge of lamping flange 19. This section 38 flares outwardly as a skirt at its lower end to provide a stop 39 opposing the shoulder 35.

For anchoring the inner can unit 12 there is provided a hollow base casting 40 having a round upper rim onto which the working section 38 is seated and weld-connected. From this connection the casting 40 slopes inwardly and gradually changes from a round to a generally rectangular shape as it merges with a base portion 40a which in turn seats on a saddle block 41. This saddle is welded to the axle 10 and has a central positioning rib 41a with a beveled peripheral face which is matched by the lower inner edge of the base portion 40a. The latter is circumferentially grooved to receive an O-ring 42 for sealing off the lower end of the inner can unit. Paralleling the axle the base casting 40 has a pair of longitudinal ears 43 for receiving a pair of U-bolts 44. These bolts have their legs connected at their lower end by respective cross-pieces 45 bearing against the underside of the axle.

The spring assembly is supplied with compressed air or some other suitable pressurized fluid through a suitable fitting 46. Since the source of the fluid would normally be carried by the vehicle frame assembly, the fitting 46 is best received by the can unit mounted on the frame, and namely, the outer can unit 13 in the illustrated embodiment.

As before mentioned, the elastic ring 14 is radially compressed between the inner and outer can units 12, 13. In this regard, it will be noted that the working faces of the inner and outer rim sections 12a, 13a are cylindrical as distinguished from the frustro-conical shape of the outer and inner faces 37, 38 which they respectively oppose. The purpose of this cylindrical form is to keep the rim sections from being subjected to any vertical force components from the compressing of the ring 14 in a direction placing the clamping ring 17 and the bolts 21 in tension. The same result would be true if the outer rim 13a tapered outwardly from the clamping ring 17 and the inner rim 12a tapered inwardly from the flange 18.

During a jouncing action, i.e. movement of the axle toward the frame, telescoping of the inner and outer can units is of course increased. This results in movement of the skirt 39 of the inner can unit toward the opposing shoulder 35 of the outer can unit and in corresponding displacement of the inner rib 14a of the elastic ring with respect to its outer rib 14b. During such movement the surface of the ring 14 above the ribs 14a, b is placed in tension circumferentially of the ring while the surface of the ring below the ribs is placed in circumferential compression. The resulting forces tend to restore or return the ring to its neutral position (Fig. 3), and hence they yieldingly resist the jouncing force. Further, during jouncing action the radial compression of the ring is increased due to the taper of the faces 37, 38 and the vertical components of the resultant forces together with the resistance to compression of the fluid supplied to the can units also yieldingly resists the jouncing force. If the latter is sufficient the telescoping of the can units may increase until the ring is compressed between the shoulder 35 and skirt 39 as shown in Fig. 4. Of importance is the fact that the ring 14 could take the entire weight of the vehicle by vertical compression between the shoulder 35 and skirt 39 should the supply of pressurized fluid to the spring be cut off.

During a rebounding action, i.e. movement of the axle away from the frame, the rebound wall 23 of the inner can unit moves toward the bumper 26 and if the rebounding action is sufficient, the bumper 26 and rebound wall will come into engagement resulting in axial compression of the bumper to take the load. Also, during such action, the surface of the ring 14 below its ribs 14a, b will be placed in tension circumferentially of the ring and the ring surface above the ribs will be placed in circumferential compression. The resulting forces yieldingly resist the rebound along with the bumper and tend to restore the ring to its neutral position.

During both jouncing and rebounding actions, the ring 14 also serves to seal off the chamber defined by the telescoped inner and outer can units. In this regard it will be noted that the opening 24 in the end wall 23 of the inner can unit is sufficiently larger than the rod 25 to permit the passage of fluid thereby, but at the same time is small enough to provide a desirable dampening effect. In most installations of my invention it will be preferable to have the supply of pressurized fluid to the can units regulated by a valve so controlled by a linkage between the frame and axle assemblies as to open to a fill position when the vertical distance between these assemblies is less than a predetermined setting and to open to a dump position when such vertical distance is greater than the setting. In this manner the riding level of the vehicle will be independent of the load thereon.

The elastic ring 14 not only seals the telescoping can units and helps to resist relative endwise displacement thereof due to jouncing or rebounding action, but it also resists radial displacement of the can units with respect to one another such as might be caused for example, by side sway or braking of the vehicle.

The advantages of the invention, it is thought, will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In an air spring, an elastic ring having inner and outer circumferential ribs, an outer unit having two clamping complements gripping said outer rib, an inner unit having two clamping complements gripping said inner rib, said units being telescopically associated with one another through part of their length and being adapted to be mounted one on a vehicle frame assembly and the other on an axle assembly, said clamping complements of the units providing two sets of opposed spaced generated surfaces between which the non-ribbed portions of the ring are compressed.

2. In an air spring, an elastic ring having an inwardly projecting rib and an outwardly projecting rib, inner and outer units telescopically associated with one another through part of their length and adapted to be mounted one on a vehicle frame assembly and the other on an axle assembly, said outer unit having two clamping complements gripping said outwardly projecting rib and said inner unit having two clamping complements gripping said inwardly projecting rib, said clamping complements of the units providing two sets of opposed spaced generated surfaces between which the ring is compressed.

3. In an air spring, an elastic ring having an inner rib and an outer rib, inner and outer units telescopically associated with one another through part of their length and adapted to be mounted one on a vehicle frame assembly and the other on an axle assembly, said outer outer unit having two clamping complements gripping said outer rib and said inner unit having two clamping complements gripping said inner rib, said clamping complements of the units providing two sets of opposed spaced inner and outer generated surfaces between which the ring is compressed, said ring and said units collectively defining a fluid pressure chamber which tends to decrease in volume as the telescoping of said units is increased.

4. The structure of claim 3 in which the inner generated surface of one of said sets is parallel to the outer generated surface of the other of said sets.

5. The structure of claim 3 in which the respective generated surfaces of said inner and outer units which are most adjacent the telescoping ends of such units are cylindrical surfaces.

6. The structure of claim 3 in which the respective generated surfaces of said inner and outer units which are most removed from the telescoping ends of such units are parallel and conical.

7. The structure of claim 3 in which each inner generated surface of said sets in parallel to and substantially equal in length with the outer generated surface of the other set.

References Cited in the file of this patent

UNITED STATES PATENTS

| 183,074 | Smith | Oct. 10, 1876 |
| 971,583 | Bell | Oct. 4, 1910 |
| 973,223 | Sharp | Oct. 18, 1910 |
| 1,403,466 | Church | Jan. 10, 1922 |
| 2,115,713 | Haire | May 3, 1938 |
| 2,716,566 | Thiry | Aug. 30, 1955 |